US012638323B2

(12) United States Patent
Vicente Oliveros et al.

(10) Patent No.: US 12,638,323 B2
(45) Date of Patent: May 26, 2026

(54) FUEL GAUGING SENSING DEVICES

(71) Applicants: Airbus Operations S.L.U., Getafe (ES); Airbus Operations Limited, Bristol (GB)

(72) Inventors: David Vicente Oliveros, Getafe (ES); Javier Ruiz De Pablo, Getafe (ES); Chris Wood, Bristol (GB)

(73) Assignees: Airbus Operations S.L.U., Getafe (ES); Airbus Operations Limited, Bristol (GB)

( * ) Notice: Subject to any disclaimer, the term of this patent is extended or adjusted under 35 U.S.C. 154(b) by 136 days.

(21) Appl. No.: 17/978,715

(22) Filed: Nov. 1, 2022

(65) Prior Publication Data

US 2023/0137856 A1     May 4, 2023

(30) Foreign Application Priority Data

Nov. 2, 2021    (EP) ..................................... 21382982

(51) Int. Cl.
  *G01F 23/292*       (2006.01)
  *B64D 37/00*        (2006.01)
       (Continued)
(52) U.S. Cl.
  CPC ....... *G01F 23/2924* (2013.01); *B64D 37/005* (2013.01); *B64D 37/04* (2013.01);
       (Continued)
(58) Field of Classification Search
  CPC .. G01D 5/268; G01D 5/35335; G01D 5/3537; G01D 5/35312; G01D 5/35316;
       (Continued)

(56) References Cited

U.S. PATENT DOCUMENTS 6,801,678 B2 *  10/2004  Murshid ............... G01F 23/292
                                                   385/12
7,672,544 B2    3/2010  Takabayashi et al.
                (Continued)

FOREIGN PATENT DOCUMENTS

BR      102014010393 A2 *  12/2015
CN      202 075 015 U      12/2011
                (Continued)

OTHER PUBLICATIONS

European Search Report for Application No. 21382982 dated Apr. 27, 2022.

*Primary Examiner* — John Fitzgerald
*Assistant Examiner* — Truong D Phan
(74) *Attorney, Agent, or Firm* — KDW Firm PLLC

(57)        ABSTRACT

A fuel gauging sensing device for a fuel tank for aircrafts includes an optical fiber harness along the internal surface of the tank, a master optical controller connected to a first terminal of the optical fiber harness, a slave optical controller connected to a second terminal of the optical fiber harness, wherein the optical fiber harness includes Fiber Bragg Grating (FBG) sensors spaced in the optical fiber harness between 1 mm and 25 mm to provide temperature gradients inside the tank and wherein the master and slave optical controllers are configured to obtain the fuel gauging of the tank based on the output from the FBG sensors.

13 Claims, 5 Drawing Sheets

(51) Int. Cl.
| | |
|---|---|
| *B64D 37/04* | (2006.01) |
| *F17C 13/02* | (2006.01) |
| *G01D 5/353* | (2006.01) |

(52) U.S. Cl.
CPC ......... *F17C 13/02* (2013.01); *G01D 5/35312* (2013.01); *G01D 5/35316* (2013.01); *F17C 2201/0109* (2013.01); *F17C 2221/012* (2013.01); *F17C 2221/032* (2013.01); *F17C 2223/0161* (2013.01); *F17C 2250/03* (2013.01); *F17C 2250/0408* (2013.01); *F17C 2250/0491* (2013.01); *F17C 2270/0189* (2013.01)

(58) Field of Classification Search
CPC . G01D 5/35374; G01F 23/292; G01F 1/6884; G01F 23/2925; G01F 23/2927; G01F 23/22; G01F 22/00; G01F 22/02; G01F 23/2924; G01K 11/32; G01K 11/3206; G02B 6/02204; G01L 11/025; F17C 13/02; F17C 2201/0109; F17C 2221/012; F17C 2221/032; F17C 2223/0161; F17C 2250/03; F17C 2250/0408; F17C 2250/0491; F17C 2270/0189; B64D 37/005; B64D 37/04; G01N 21/45; G01N 33/18; G01N 33/22; G01N 33/0004
USPC ................. 73/290 R, 291–293, 295; 385/12
See application file for complete search history.

(56) References Cited

U.S. PATENT DOCUMENTS

| | | | | |
|---|---|---|---|---|
| 8,203,707 | B2 | 6/2012 | Xu | |
| 8,225,653 | B2 | 7/2012 | Krammer | |
| 9,057,637 | B2 | 6/2015 | Krammer | |
| 9,074,921 | B1 * | 7/2015 | Parker, Jr. ............. | G01F 23/802 |
| 10,809,192 | B2 | 10/2020 | Salenbien | |
| 2005/0263281 | A1 * | 12/2005 | Lovell ..................... | E21B 23/12 |
| | | | | 166/250.07 |
| 2006/0170543 | A1 | 8/2006 | Schaffer et al. | |
| 2008/0049202 | A1 * | 2/2008 | Kraehmer ........... | G03F 7/70891 |
| | | | | 355/30 |
| 2009/0129721 | A1 | 5/2009 | Chen et al. | |
| 2011/0242525 | A1 * | 10/2011 | Strong ................ | G01M 11/083 |
| | | | | 356/73.1 |
| 2014/0112361 | A1 * | 4/2014 | Njegovec ........... | H01S 5/06216 |
| | | | | 372/34 |
| 2015/0069996 | A1 * | 3/2015 | Imaoka .................. | G01R 15/22 |
| | | | | 385/13 |
| 2017/0248460 | A1 * | 8/2017 | Staudinger ........ | G01D 5/35316 |
| 2019/0316896 | A1 * | 10/2019 | Chilukuri .............. | G01B 11/14 |

FOREIGN PATENT DOCUMENTS

| | | | | | |
|---|---|---|---|---|---|
| CN | 111678615 | A | * | 9/2020 | |
| EP | 3 096 117 | A1 | | 11/2016 | |
| EP | 2867638 | B1 | * | 4/2021 | ......... G01K 11/3206 |
| JP | H06160645 | A | * | 6/1994 | |
| JP | 2010 281760 | A | | 12/2010 | |
| KR | 20100072671 | A | * | 7/2010 | .......... G01F 23/292 |

* cited by examiner

FUEL GAUGING SENSING DEVICES

TECHNICAL FIELD

The disclosure herein refers to a fuel gauging sensing device for a fuel tank for aircrafts, the fuel gauging sensing device comprising a plurality of sensors to obtain accurate fuel gauging values inside the fuel tank.

BACKGROUND

Precise means of gauging fuel tanks for commercial aircraft applications are not well established in the current technology. In particular, existing Liquid Hydrogen (LH2) tanks for commercial aircraft application have been limited to research and development paper studies or flight test demonstrators.

In this regard, U.S. Pat. No. 8,225,653 relates to a filling level detector for cryogenic liquids which are located in a container that uses a probe with a superconductor. In order to provide a filling level detector which is insensitive and costs little, the probe is a flat conductor which comprises a plurality of conductors which are routed parallel in a plastic matrix, of which a first conductor is a super conductor, second conductors are used to supply heating current to the first conductor, and third conductors are used for voltage measurement, with the conductors in one pair each being connected to points which are at a distance from one another in the longitudinal direction of the probe. The probe is guided in a guide in the container.

U.S. Pat. No. 9,057,637 relates to a method and a device for optically determining state variables inside a container for liquefied gases. In the method and device, light emitted by an illumination unit travels within an optical waveguide to a contact point with the content of the container and is partially reflected there, the intensity of the reflected light is measured by an image sensor, and a state variable is determined from the intensity. In order to create a comprehensive "image" of the state variables in the container and of the container content, several optical waveguides are guided to contact points which are distributed within the container and form measurement points. Locally assigned state variables (refractive index, density, temperature, etc.) of the container content are determined from the measured values obtained at the measurement points and are evaluated along with the spatial coordinates of the measurement points in the container.

Considering prior art on kerosene aircraft fuel systems, it is not foreseen that current state of the art technology for electrical installations inside kerosene tanks (harnesses supported on adhesive brackets) could be used in fuel tanks, as e.g. LH2 tanks due to:

Tank design: the tank is all welded. A welded tank means it cannot be opened to repair or replace any electrical cables or supports.

Tank size: approximately 4 meters long, 1 meter diameter.

Fuel type: Liquid hydrogen needs to be stored under pressure and very low temp (−253° C./20K). In order to maintain liquid hydrogen at this temperature, tanks must be highly insulated and therefore the number of tank wall interfaces and connections must be minimized to minimize heat gain from the environment.

Hence, there is a need to obtain improved approaches of gauging fuel tanks for commercial aircrafts, that could be used, e.g., in liquid hydrogen tanks, cryogen tanks and kerosene tanks. The disclosure herein satisfies this demand.

SUMMARY

This disclosure herein is to be used for quantity, pressure and temperature measurement systems installation inside fuel tanks for aircrafts as e.g. Liquid Hydrogen tanks, cryogen tanks or kerosene tanks.

More precisely this disclosure herein provides continuous internal support to optical fiber cables with integrated sensors along the complete length and circumference of the fuel tank, enabling the measurement of data at multiple locations within the tank using a single fuel gauging device.

The disclosure herein aims to replace individual tank sensors and associated interconnection means with a single near continuous sensor which enables modularity and ease of replacement in-service.

Hence, in a first aspect, the disclosure herein relates to a fuel gauging sensing device for a fuel tank for aircrafts, the device comprising an optical fiber harness established along the internal surface of the tank, a master optical controller connected to a first terminal of the optical fiber harness, and a slave optical controller connected to a second terminal of the optical fiber harness. The optical fiber harness can comprise a plurality of Fiber Bragg Grating, FBG, sensors, wherein the FBG sensors are spaced in the optical fiber harness between 1 mm and 25 mm and configured to provide temperature gradients inside the tank. The master and slave optical controllers are configured to obtain the fuel gauging of the tank based on the output from the plurality Fiber Bragg Grating, FBG, sensors.

In a preferred example, the optical fiber harness can further comprise a plurality of intrinsic fiber sensors configured to measure the refractive index of a medium surrounding the sensor inside the tank. The intrinsic fiber sensors are spaced in the optical fiber harness between 1 mm and 25 mm. The master and slave optical controllers are configured to obtain the fuel gauging of the tank based on the output of the plurality of intrinsic fiber sensors and the plurality of FBG sensors.

In a preferred example, the optical fiber harness further can further comprise one or more Fabry Perot sensors configured to obtain absolute pressure, and/or temperature and/or refractive index values at specific points inside the tank. In this example, the master and slave optical controllers are configured to obtain the fuel gauging of the tank based on the output of the one or more Fabry Perot sensors, the plurality of intrinsic fiber sensors and the plurality of FBG sensors.

In preferred examples, the optical fiber harness can comprise single or multiple flexible optical fiber cables.

In preferred examples, the optical fiber harness can comprise a helical form and can be established from a first end of the internal surface of the tank to an opposite end of the internal surface of the tank.

In preferred example, the fuel gauging sensing device can comprise a helical track configured to allocate the optical fiber harness, the helical track having an adjustable helical pitch and length. The helical track can comprise a flat plate configured to attach the fiber harness to the helical track, or the helical track can comprise a plate with holes configured to attach the fiber harness to the helical track, or the helical track can comprise a set of brackets configured to attach the fiber harness to the helical track.

In a further aspect, the disclosure herein relates to a cryogen tank comprising the fuel gauging sensing device according to the disclosure herein. The cryogen tank can comprise a frame and a first and second wall interface ports. The frame can be configured to allocate the helical track. The first interface port can be configured to permit an operator to access the master optical controller and the second interface port can be configured to permit an operator to access the slave optical controller.

In a further aspect, the disclosure herein relates to a liquid hydrogen tank comprising the fuel gauging sensing device according to the disclosure herein. The liquid hydrogen tank further can comprise a frame and a first and second wall interface ports. The frame can be configured to allocate the helical track, the first interface port is configured to permit an operator to access the master optical controller and the second interface port can be configured to permit an operator to access the slave optical controller.

In a further aspect, the disclosure herein relates to a kerosene tank comprising the fuel gauging sensing device according to according to the disclosure herein. The kerosene tank can comprise a frame and a first and second wall interface ports. The frame can be configured to allocate the helical track, the first interface port can be configured to permit an operator to access the master optical controller and the second interface port can be configured to permit an operator to access the slave optical controller.

BRIEF DESCRIPTION OF THE DRAWINGS

For a better understanding the above explanation and for the sole purpose of providing an example, some non-limiting drawings are included that schematically depict a practical embodiment.

DETAILED DESCRIPTION

Figure 1:
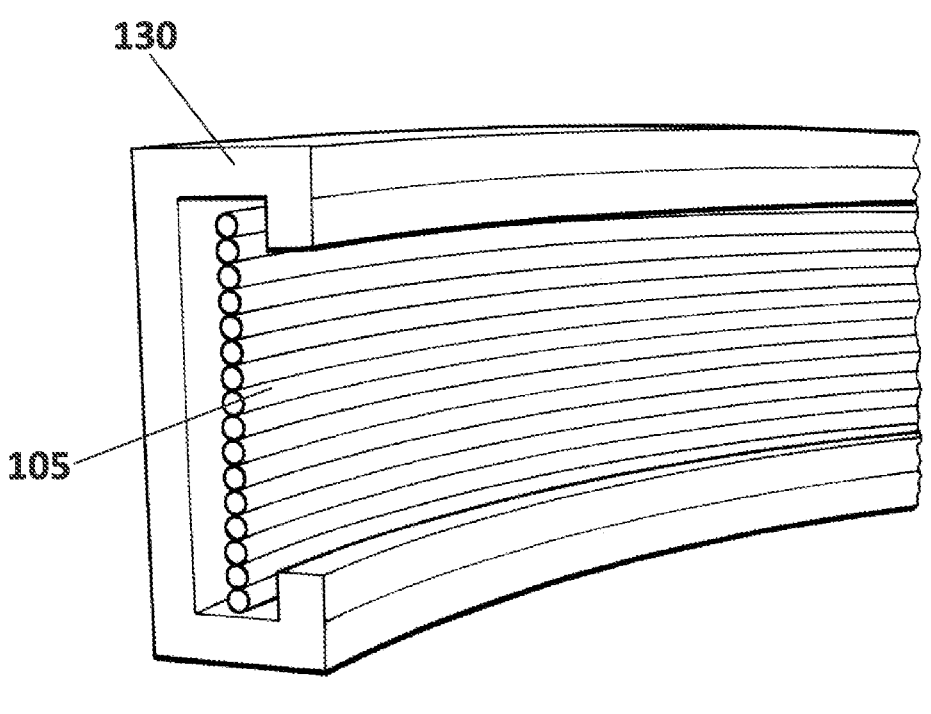
FIG. 1 shows the optical fiber harness and the helical track as part of the fuel gauging sensing device according to the disclosure herein.

FIG. 1 shows the optical fiber harness 105 as part of the fuel gauging sensing device 100. The optical fiber harness 105 comprises a helical form and is established from a first end of the internal surface of the tank 150 to an opposite end of the internal surface of the tank 150 (not shown in this figure). The optical fiber cable routing geometry of the optical fiber harness 105 follows a continuous helical form around the inside surface of the tank 150 from one end to the other.

The helical routing and multiple sensor locations along the complete tank length and around the complete circumference of the tank 150 ensures that the required level measurement accuracy is maintained at all conceivable aircraft pitch and roll attitudes. As shown in the figure, multiple optical fiber cables can be routed in a single track thus providing functional redundancy or increased accuracy.

Figure 9:
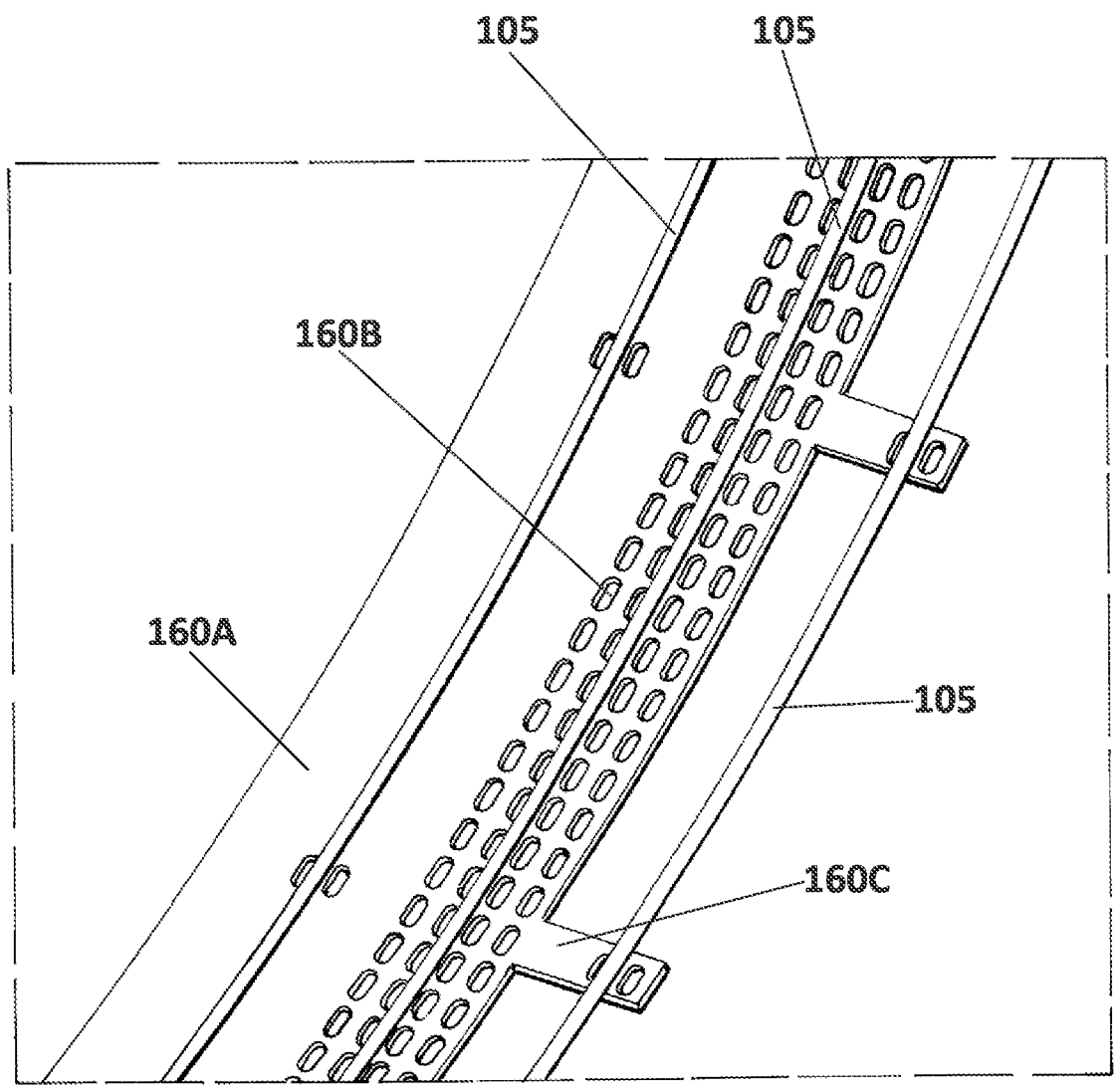
FIG. 9 shows three different fiber fixation concepts of the fuel gauging sensing device according to the disclosure herein.

FIG. 1 also shows the helical track 130 as part of the fuel gauging sensing device 100 (shown in FIGS. 6 and 7) according to the disclosure herein. Single or multiple flexible optical fiber cables are slid into the helical track 130 which can be rigid and which is attached to the inside surface of the tank 150. The helical track 130 can be configured to allocate the optical fiber harness 105. The helical track 130 comprises an adjustable helical pitch and length, providing a simple design that is easily adaptable to different tank lengths/diameters and accuracy requirements by extending or reducing the coil pitch and length of the helical track 130. Furthermore, the helical track 130 may be mounted on a 'sub-frame' to enable ease of installation, particularly on long tanks. Several fixation concepts to attach the optical fiber harness 105 to the helical track 130 are shown in FIG. 9.

Figure 2:
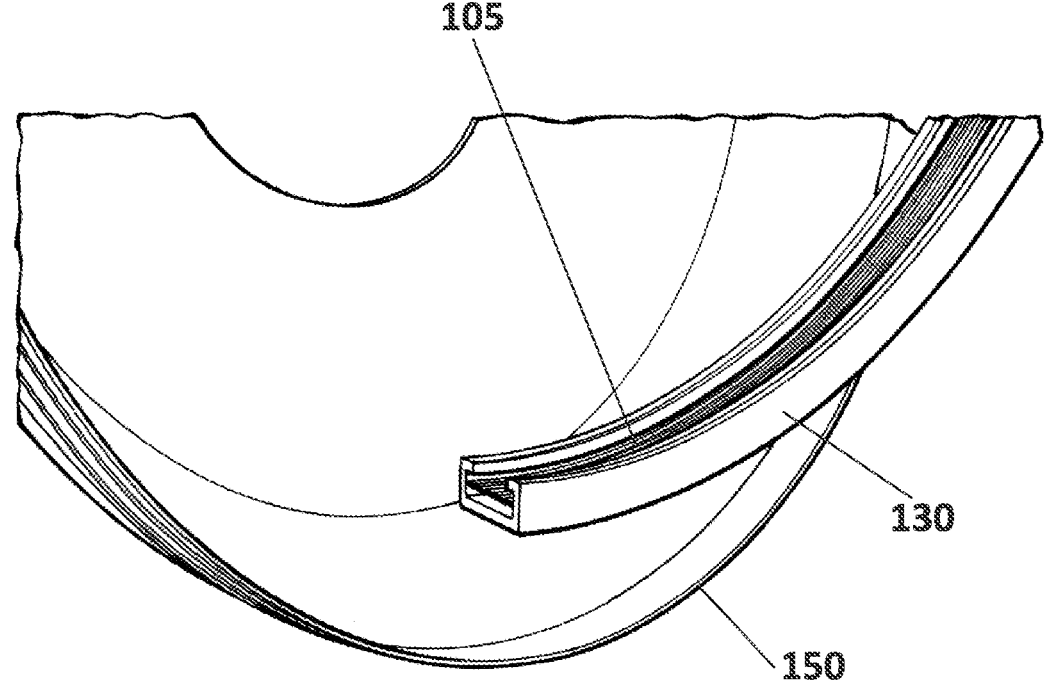
FIG. 2 shows the optical fiber harness and the helical track according to the disclosure herein and a section of the fuel tank for aircrafts.

FIG. 2 shows the optical fiber harness 105 and the helical track 130 according to the disclosure herein and a section of the fuel tank 150 for aircrafts. Open "C" section track profile enables optical cable to be in direct contact with the fuel, as e.g., LH2 or kerosene in order to obtain the gauging measurements.

Figures 3, 4, 5:
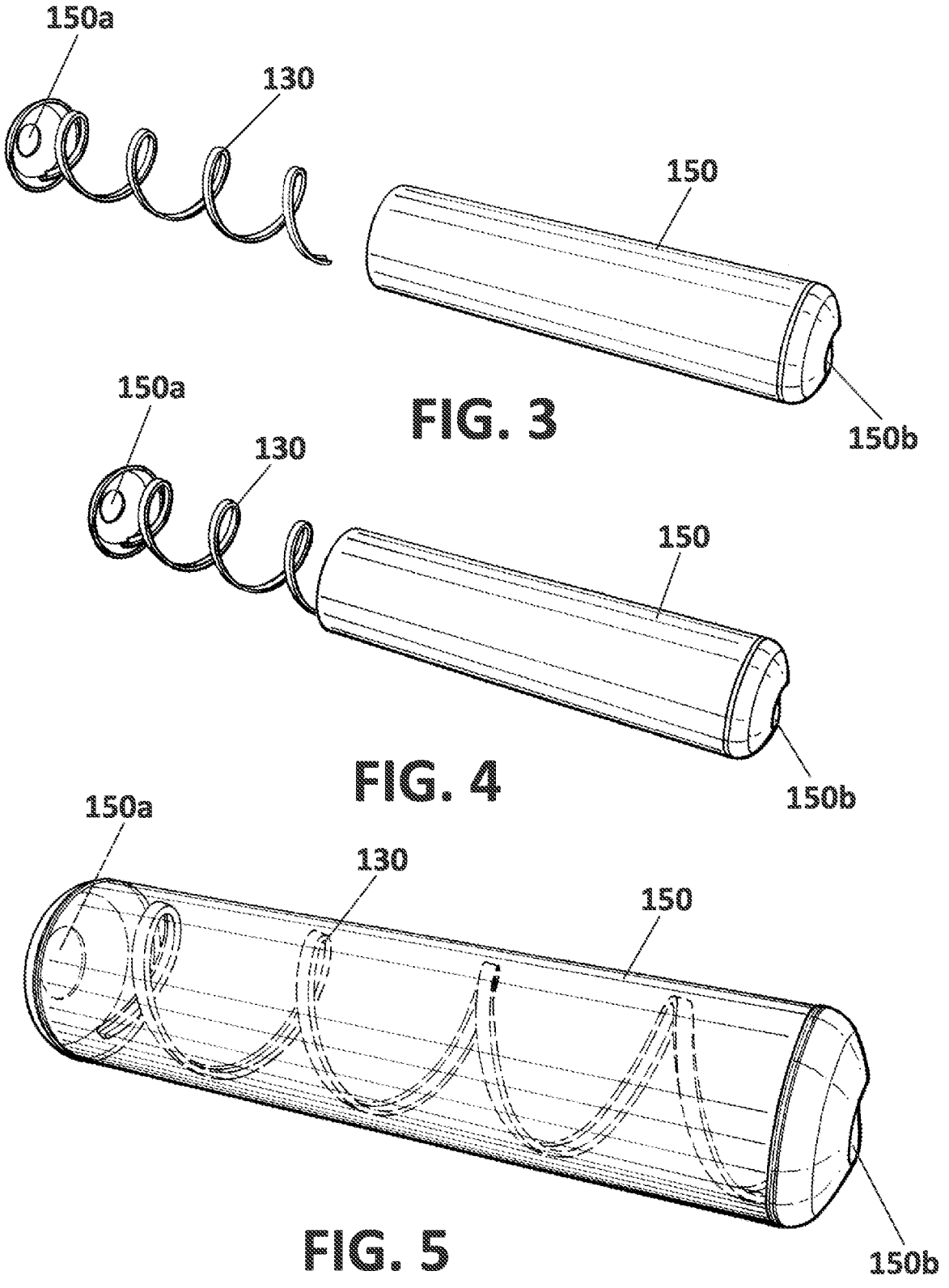
FIGS. 3 through 5 show the installation of the optical fiber harness and the helical track according to the disclosure herein into the fuel tank for aircrafts.

FIGS. 3 through 5 shows the installation of the optical fiber harness 105 and the helical track 130 as part of the fuel gauging device according to the disclosure herein into the fuel tank 150 for aircrafts. The tank 150 comprises two wall interface ports 150a, 150b located in the bezels of the tank 150 to permit installation of the fuel gauging device comprising the optical fiber harness 105 and the helical track 130. Heat transfer is reduced by having two wall interfaces ports 150a, 150b. Furthermore, the installation of the fuel gauging device simplifies tank manufacturing and assembly by pre-assembling the optical fiber harness 105 into the helical track 130 outside the tank 150 and then installing the modular assembly into the tank 150 in one single operation.

As shown in the figures, one end of the rigid track is located immediately adjacent to a first tank wall port 150a (most likely in the end 'bezel' of the tank 150 through which the optical fiber harness 105 passes or is connected).

In the event of failure in-service, a default optical fiber cable of the optical fiber harness 105 can be removed (pulled) through the assess tank wall port 150a or 150b and a new optical fiber cable can be installed (pushed) through the same port.

The proposed fuel gauging sensing device 100 improves operability during the life of the aircraft by enabling the replacement of the optical fiber cables of the optical fiber harness 105 from outside of the tank 150 through the two wall interface ports 150a, 150b, preferably located in the bezels of the tank 150 to assure segregation and work in master-slave logic, enabled by the optical fiber harness 105 sliding in the helical track 130, because access for manual operations inside of the tank will not be possible in service due to all-welded construction of the fuel tank.

Figure 6:
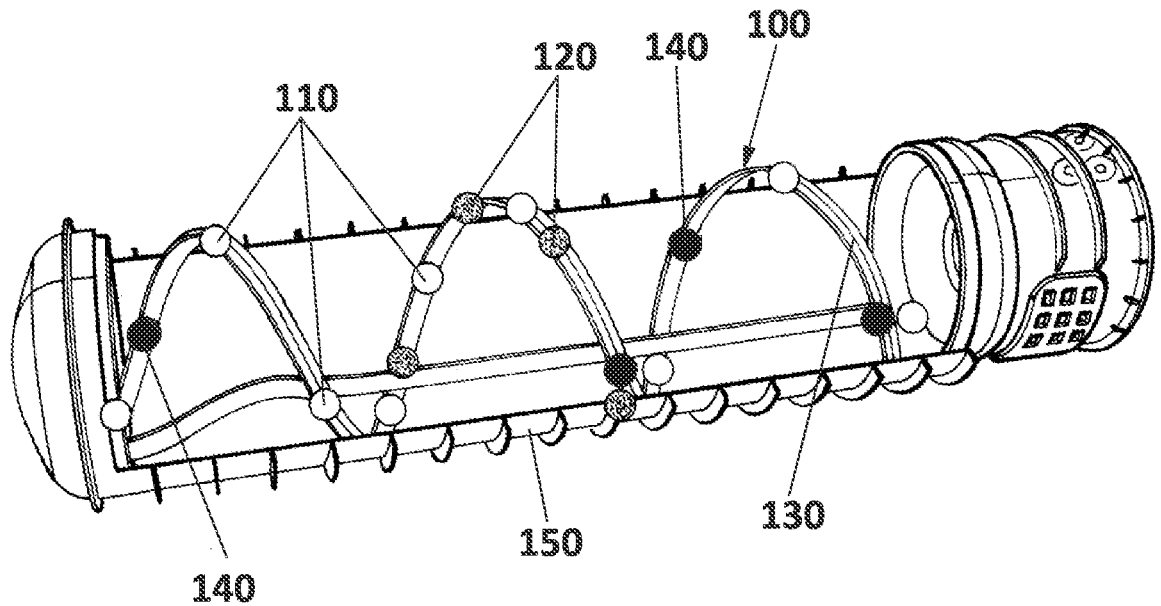
FIG. 6 shows the fuel gauging sensing device inside the fuel tank for aircrafts, the proposed fuel gauging sensing device comprises the optical fiber harness and the helical track and a plurality of sensors.

FIG. 6 shows the fuel gauging sensing device 100 inside the fuel tank for aircrafts, the fuel gauging sensing device 100 comprises the optical fiber harness 105 and the helical track 130 and a plurality of sensors. The disclosure herein uses existing Fiber Bragg Grating (FBG) and additionally Fabry Perot Sensing technology for level/gauging sensing which enables multiple measurement points along the length of the optical fiber harness 105. In particular:

In a first embodiment, the fuel gauging sensing device 100 comprises a plurality of Fiber Bragg Grating, FBG, sensors 110 with a minimum spacing between 1 mm and 25 mm and configured to provide temperature gradients inside the tank 150, and wherein the master and slave optical controllers 115*a*, 115*b* are configured to obtain the fuel gauging of the tank 150 based on the output from the plurality of Fiber Bragg Grating, FBG, sensors 110. Helical pitch can be adjusted to give more intermediate readings if needed depending on tank proportions. The distance of the spacing between sensors 110 will be depending on the size of the tank 150 and can be targeted to achieve a 1% minimum level of measurement accuracy.

In a second embodiment, the optical fiber harness 105 further comprises a plurality of intrinsic fiber sensors 140 configured to measure the refractive index of the medium surrounding the sensor inside the tank 150. The refractive index for gas hydrogen and for liquid hydrogen can be different so this fact would allow to obtain the gauging of the fuel inside the tank 150. The sensors 140 can have a minimum spacing between 1 mm and 25 mm in order to be able to detect the interface between liquid hydrogen and gas hydrogen. The distance of the spacing between sensors 140 can depend on the size of the tank 150 and it is targeted to achieve a 1% minimum level of measurement accuracy. The master and slave optical controllers 115*a*, 115*b* are configured to obtain the fuel gauging of the tank 150 based on the output of the plurality of Fiber Bragg Grating, FBG, sensors 110 and the intrinsic fiber sensors 140. The sensors 110, 120, 140 can be fixed to the helical track 130 and connected through the flexible optical fiber harness 105.

In a third embodiment (which is shown in FIG. 6), the fuel gauging sensing device 100 further comprises one or more Fabry Perot sensors 120 configured to provide absolute pressure, and/or temperature and/or refractive index values at specific points inside the tank 150, wherein the master and slave optical controllers 115*a*, 115*b* are configured to obtain the fuel gauging of the tank based on the output of the one or more Fabry Perot sensors 120, the output of the plurality of Fiber Bragg Grating, FBG, sensors 110, and the intrinsic fiber sensors 140. The sensors 110, 120, 140 can be fixed to the helical track 130 and connected through the flexible optical fiber harness 105.

Figure 7:
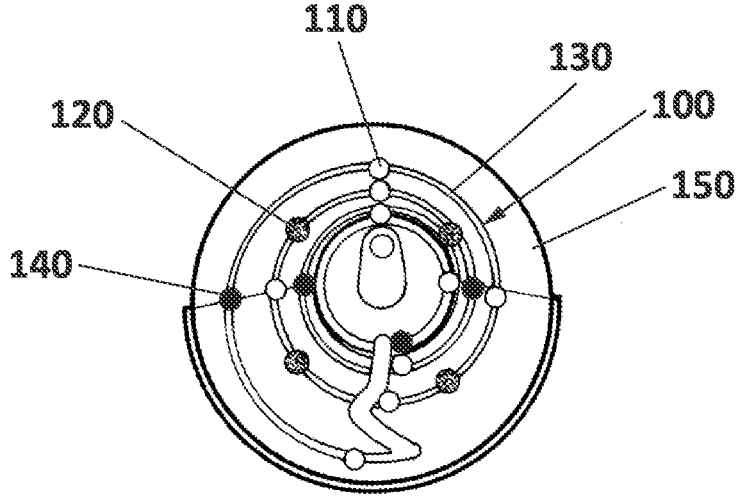
FIG. 7 shows a front view of the tank including the proposed fuel gauging sensing device according to the disclosure herein.

FIG. 7 shows a front view of the tank 150 including the fuel gauging sensing device 100 according to the disclosure herein. The fuel gauging sensing device 100 permits a simple design that is easily adaptable to different tank lengths/diameters and accuracy requirements by altering the number of FBG, sensors 110, Fabry Perot sensors 120 and the intrinsic fiber sensors 140 on the fibers. Helical pitch can be adjusted to give more intermediate readings if needed depending on tank proportions.

Hence, the present application permits fuel gauging covered by fiber optic with FBG's sensors 110 installed in the helical track 130 can provide temperature gradients in the interface liquid-to-gas combined with absolute pressure/temperature optical sensors based on Fabry Perot technology and intrinsic fiber sensors 140 that permit independent level sensing based on absolute pressure/temperature and refractive index optical sensing.

Figure 8:
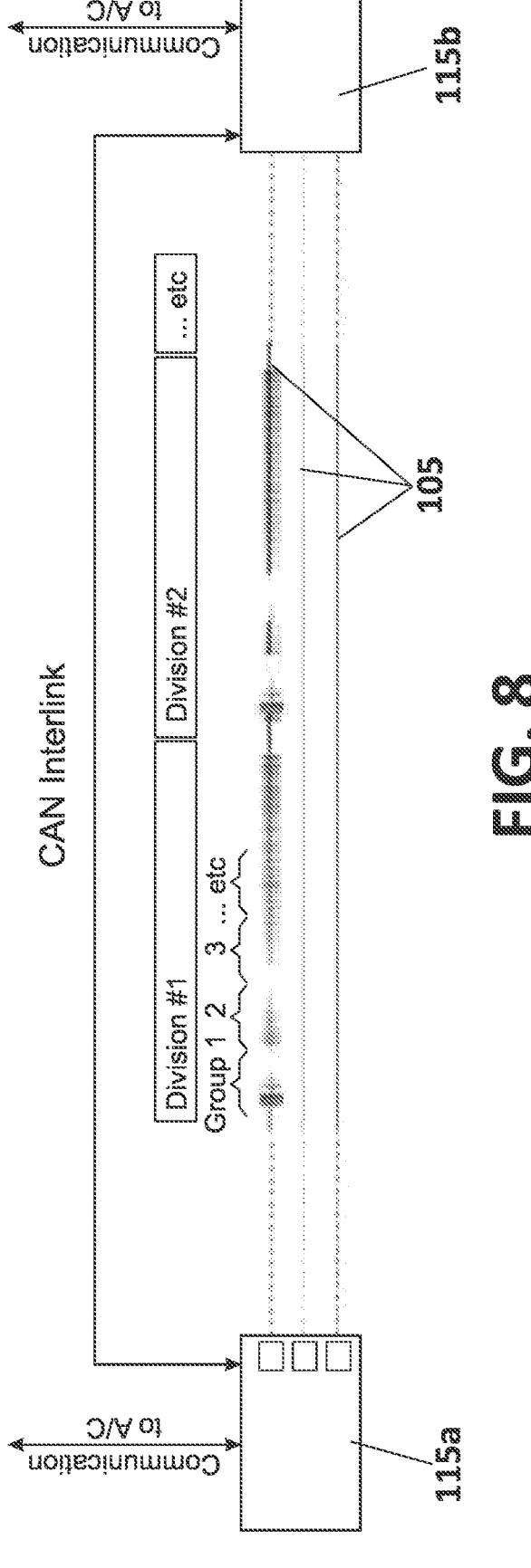
FIG. 8 shows the master and slave optical controllers as part of the fuel gauging sensing device according to the disclosure herein.

FIG. 8 shows the master and slave optical controllers 115*a*, 115*b* as part of the fuel gauging sensing device 100 according to the disclosure herein. Two wall ports 150*a*,

150*b* can be used in order to route the optical cables in a master-slave configuration with the master and slave optical controllers 115*a*, 115*b*.

FIG. 9 shows three different fiber fixation concepts performed in the fuel gauging sensing device 100 according to the disclosure herein. The helical track 130 is configured to allocate the optical fiber harness 105. The attachment or fixation of the optical fiber harness 105 within the helical track 130 of the fuel gauging sensing device 100 can be carried out by performing different fixation concepts.

A first fixation concept is show in FIG. 9, wherein the optical fiber harness 105 comprising a single optical fiber can be attached to a flat plate 160A.

A second fixation concept is shown in FIG. 9, wherein the optical fiber harness 105 fiber can be attached to a plate with holes 160B.

A third fixation concept shown in FIG. 9, wherein the optical fiber harness 105 fiber is attached to a set of brackets 160C. It is show in FIG. 9, that the optical fiber harness 105 can be hanging from those brackets 160C.

The fuel gauging sensing device 100 according to the disclosure herein can be used in a cryogen tank, in a liquid hydrogen tank, and/or a kerosene tank.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuel gauging sensing device for a fuel tank for aircrafts, the device comprising:

an optical fiber harness established along an internal surface of the tank;

a master optical controller connected to a first terminal of the optical fiber harness;

a slave optical controller connected to a second terminal of the optical fiber harness; and a helical track configured to allocate the optical fiber harness, the helical track having an adjustable helical pitch and length;

wherein the optical fiber harness comprises a plurality of Fiber Bragg Grating (FBG) sensors;

wherein the FBG sensors are spaced in the optical fiber harness between 1 mm and 25 mm and configured to provide temperature gradients inside the tank;

wherein the optical fiber harness comprises a plurality of intrinsic fiber sensors configured to measure a refractive index of a medium surrounding the sensors inside the tank;

wherein the intrinsic fiber sensors are spaced in the optical fiber harness between 1 mm and 25 mm;

wherein the optical fiber harness comprises one or more Fabry Perot sensors configured to obtain absolute pressure, temperature, and/or refractive index values at specific points inside the tank;

wherein the first and second controllers are configured to gauge the fuel of the tank based on the absolute pressure, temperature, and/or refractive index values at specific points inside the tank from the one or more Fabry Perot sensors, the refractive index of the medium surrounding the plurality of intrinsic fiber sensors from the plurality of intrinsic fiber sensors, and the temperature gradients inside the tank from the plurality of FBG sensors;

wherein the optical fiber harness comprises a helical form and is established from a first end of the internal surface of the tank to an opposite end of the internal surface of the tank.

2. The fuel gauging sensing device according to claim 1, wherein the optical fiber harness comprises single or multiple flexible optical fiber cables.

3. The fuel gauging sensing device according to claim 1, wherein the helical track comprises a flat plate configured to attach the fiber harness to the helical track.

4. The fuel gauging sensing device according to claim 1, wherein the helical track comprises a plate with holes configured to attach the fiber harness to the helical track.

5. The fuel gauging sensing device according to claim 1, wherein the helical track comprises a set of brackets configured to attach the fiber harness to the helical track.

6. A cryogen tank comprising the fuel gauging sensing device according to claim 1.

7. The cryogen tank according to claim 6, comprising a frame and a first and second wall interface ports;

wherein the frame is configured to allocate the helical track;

wherein the first interface port is configured to permit an operator to access the master optical controller; and wherein the second interface port is configured to permit an operator to access the slave optical controller.

8. A liquid hydrogen tank comprising the fuel gauging sensing device according to claim 1.

9. The liquid hydrogen tank according to claim 8, comprising a frame and a first and second wall interface ports;

wherein the frame is configured to allocate the helical track;

wherein the first interface port is configured to permit an operator to access the master optical controller; and wherein the second interface port is configured to permit an operator to access the slave optical controller.

10. A kerosene tank comprising the fuel gauging sensing device according to claim 1.

11. The kerosene tank according to claim 10, comprising a frame and a first and second wall interface ports;

wherein the frame is configured to allocate the helical track;

wherein the first interface port is configured to permit an operator to access the master optical controller; and wherein the second interface port is configured to permit an operator to access the slave optical controller.

12. A fuel gauging sensing device for a fuel tank for aircrafts, the device comprising:

an optical fiber harness established along an internal surface of the tank;

a master optical controller connected to a first terminal of the optical fiber harness;

a slave optical controller connected to a second terminal of the optical fiber harness; and a helical track configured to allocate the optical fiber harness;

wherein the optical fiber harness comprises a plurality of Fiber Bragg Grating (FBG) sensors;

wherein the FBG sensors are spaced in the optical fiber harness between 1 mm and 25 mm and configured to provide temperature gradients inside the tank;

wherein the optical fiber harness comprises a plurality of intrinsic fiber sensors configured to measure a refractive index of a medium surrounding the sensors inside the tank;

wherein the intrinsic fiber sensors are spaced in the optical fiber harness between 1 mm and 25 mm;

wherein the optical fiber harness comprises one or more Fabry Perot sensors configured to obtain absolute pressure, temperature, and/or refractive index values at specific points inside the tank;

wherein the first and second controllers are configured to gauge the fuel of the tank based on the absolute pressure, temperature, and/or refractive index values at specific points inside the tank from the one or more Fabry Perot sensors, the refractive index of the medium surrounding the plurality of intrinsic fiber sensors from the plurality of intrinsic fiber sensors, and the temperature gradients inside the tank from the plurality of FBG sensors;

wherein the optical fiber harness comprises a helical form and is established from a first end of the internal surface of the tank to an opposite end of the internal surface of the tank; and wherein the helical track comprises a flat plate configured to attach the fiber harness to the helical track.

13. A fuel gauging sensing device for a fuel tank for aircrafts, the device comprising:

an optical fiber harness established along an internal surface of the tank;

a master optical controller connected to a first terminal of the optical fiber harness;

a slave optical controller connected to a second terminal of the optical fiber harness;

a helical track configured to allocate the optical fiber harness;

wherein the optical fiber harness comprises a plurality of Fiber Bragg Grating (FBG) sensors;

wherein the FBG sensors are spaced in the optical fiber harness between 1 mm and 25 mm and configured to provide temperature gradients inside the tank;

wherein the optical fiber harness comprises a plurality of intrinsic fiber sensors configured to measure a refractive index of a medium surrounding the sensors inside the tank;

wherein the intrinsic fiber sensors are spaced in the optical fiber harness between 1 mm and 25 mm;

wherein the optical fiber harness comprises one or more Fabry Perot sensors configured to obtain absolute pressure, temperature, and/or refractive index values at specific points inside the tank;

wherein the first and second controllers are configured to gauge the fuel of the tank based on the absolute pressure, temperature, and/or refractive index values at specific points inside the tank from the one or more Fabry Perot sensors, the refractive index of the medium surrounding the plurality of intrinsic fiber sensors from the plurality of intrinsic fiber sensors, and the temperature gradients inside the tank from the plurality of FBG sensors;

wherein the optical fiber harness comprises a helical form and is established from a first end of the internal surface of the tank to an opposite end of the internal surface of the tank; and wherein the helical track comprises a plate with holes configured to attach the fiber harness to the helical track.

* * * * *